United States Patent [19]

Schneider

[11] Patent Number: 4,468,831
[45] Date of Patent: Sep. 4, 1984

[54] ICE SCRAPER

[75] Inventor: Otto W. Schneider, Sioux City, Iowa

[73] Assignee: The Weller Company, Sioux City, Iowa

[21] Appl. No.: 508,264

[22] Filed: Jun. 27, 1983

[51] Int. Cl.³ .............................. A47L 1/06; B60S 1/04
[52] U.S. Cl. ...................................... 15/236 R; 30/169
[58] Field of Search .................. 15/104 S, 236 R, 245; 30/169, 172, 329, 339; D32/48

[56] References Cited

U.S. PATENT DOCUMENTS

| | | | |
|---|---|---|---|
| 2,536,311 | 1/1951 | Rojakovick | 15/236 R |
| 4,124,915 | 11/1978 | Schlicher | 15/236 R X |
| 4,202,093 | 5/1980 | Wallerstein | 30/169 |

Primary Examiner—Edward L. Roberts
Attorney, Agent, or Firm—Henderson & Sturm

[57] ABSTRACT

A scraper blade made of plastic material which is frictionally held in place in a housing having a handle attached thereto and having access openings therein leading to a beveled scraping edge which is not being used, whereby such scraper blade may be easily reversed, thereby doubling the useful life of such scraper.

3 Claims, 3 Drawing Figures

ICE SCRAPER

TECHNICAL FIELD

This invention relates to ice scrapers of a type used for scraping ice and snow from the windows of vehicles in the wintertime and more particularly to such a scraper having a reversible scraper blade.

BACKGROUND ART

Various configurations of ice scrapers have been used in the past for scraping ice and snow from the windshield of vehicles. The earliest forms of such scrapers were metal but with the advent of many types of plastic materials it is today more common that such scrapers be formed of a plastic material which is hard enough to scrape off ice but not so hard to damage the windshield glass itself. Of course, many different configurations of such plastic have been used.

A problem associated with the use of such plastic scrapers is that the edge becomes dull after extensive use and at some point becomes so dull that the scraper is no longer useful, or at least not efficient, for its intended purpose and is discarded, rather than re-sharpened.

Because of this situation wherein plastic scrapers are disposed of once the edge becomes dull, there has developed a need to extend the useful life of this type of a scraper.

DISCLOSURE OF THE INVENTION

The present invention provides an inexpensive and practical way of doubling the life of a scraper of a type identified above. The present invention provides for a scraper blade made of plastic material which is frictionally held in place in a housing having a handle attached thereto and having access openings leading to a beveled scraping edge which is not being used, whereby such scraper blade may be easily reversed, thereby doubling the useful life of such scraper.

An object of the present invention is to provide an improved plastic scraper for scraping ice and snow from the windows of vehicles in the wintertime.

Another object of the present invention is to provide an ice scraper of the type identified above which has a much longer life than plastic scrapers heretofore available commercially.

A further object of the present invention is to provide a plastic scraper blade for ice scrapers which is reversible.

A still further object of the present invention is to provide a reversible plastic blade structure for an ice scraper which is inexpensive to produce and simple to use.

Other objects, advantages, and novel features of the present invention will become apparent from the following description of the best mode for carrying out this invention.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
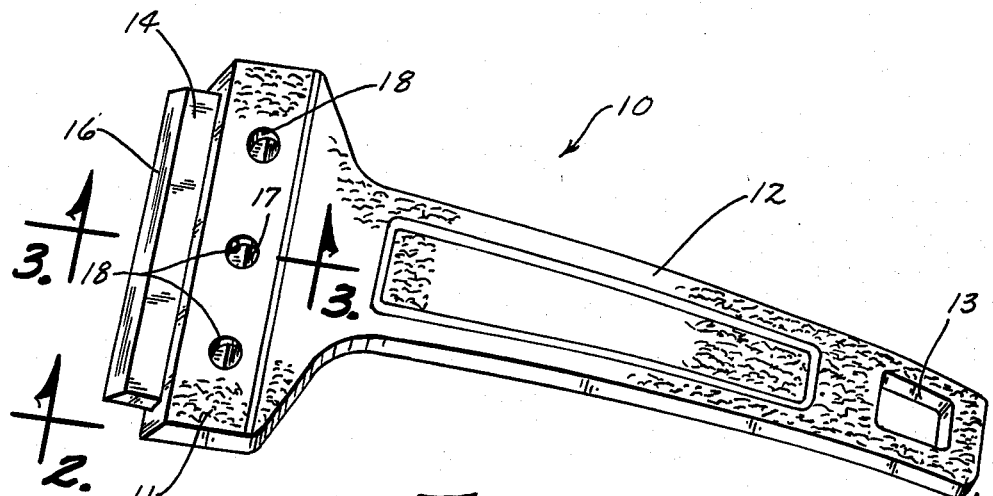
FIG. 1 shows a perspective view of an ice scraper constructed in accordance with the present invention.
Figure 2:
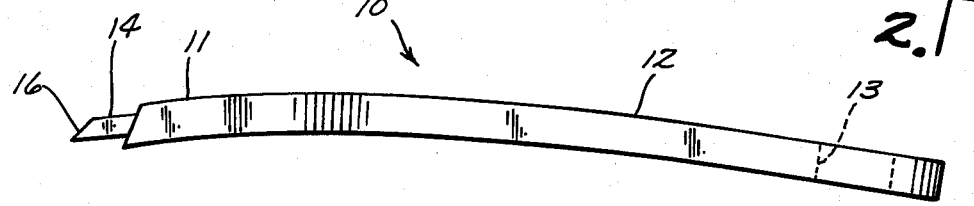
FIG. 2 is a side elevational view taken along line 2—2 of FIG. 1.

Referring now to the drawings, wherein like reference numerals designate identical or corresponding parts throughout the several views, FIG. 1 shows an ice scraper 10 constructed in accordance with the present invention.

The ice scraper (10) includes a housing portion (11) having a handle (12) integrally formed in one piece with such housing (11). One end of the handle (12) has an opening (13) therein for allowing such ice scraper to be hung up for storage.

Figure 3:
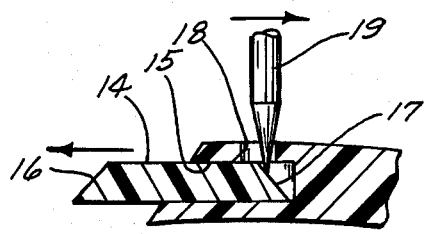
FIG. 3 is an enlarged partial cross-sectional view taken along line 3—3 of FIG. 1 and showing the process of removing the scraper element from the housing of the preferred embodiment.

A scraper blade element (14) is disposed in an opening (15) in the housing (11) as can readily be appreciated by viewing FIG. 3. This scraper element (14) is preferably formed of a plastic material, such as Plexiglas. The scraper element (14) has a first beveled edge (16) and a second beveled edge (17). The first and second beveled edges (16 and 17) are substantially identical so that the scraper element (14) is reversible.

The construction of the best mode of this invention as shown by the scraper (10) is that the housing (11) and handle (12) is injection molded of plastic material and is formed completely in that process, including the opening (15) and access openings (18) which will be discussed in detail below. The scraper elements (14) are formed by cutting them from sheets of plastic material, such as Plexiglas, but such scraper elements can, of course, be formed in other ways such as by injection molding.

The assembly of the two parts of the ice scraper (10) is merely to force the end (17) of the scraper element (14) into the opening (15). It will be clearly understood to those skilled in this art that the relative sizes of the scraper element (14) and the opening (15) must be of a proper size to allow the scraper element (14) to be received within the opening (15) and in a tight enough fashion to hold it firmly and yet allow it to be not so tight as to prevent removal.

In use, the scraper (10) would be utilized in the fashion of any ordinary ice scraper for scraping ice from windshields and other windows of vehicles in the wintertime, and this use would continue until such time that the beveled edge (16) became so dull that the scraper (10) is not effective for this purpose. When the beveled edge (16) becomes so dull that the user does not wish to use it any more, then, instead of throwing the entire scraper (10) away as had been done in the past, a tool (19), which may be an ice pick, screwdriver, pen or pencil, or any other tool that will fit through the openings (18) in the housing (11), can be utilized for prying the scraper element (14) out of the opening (15), as illustrated in its beginning stages in FIG. 3. After the scraper element (14) has been removed, then it is merely reversed and the beveled edge (16) is forced into the scraper opening (15) to the point where the beveled edge (17) appears in FIG. 3. Then the scraper (10) is again useful until such time that the scraper edge (17) becomes so dull that the user no longer wishes to use it. Consequently, it can be readily appreciated that the useful life of a scraper (10) is effectively then doubled by having two working beveled edges (16 and 17), rather than only one as has been the case in the past.

Obviously, many modifications and variations of the present invention are possible in light of the above teachings. For example, after both of the edges (16 and 17) have been used, a new scraper element (14) could be utilized such that the housing (11) and handle (12) could be used indefinitely and merely replace the scraper element (14) after both of the useful edges have outlived their usefulness. It is therefore to be understood that, within the scope of the appended claims, the invention may be practiced otherwise than as specifically described.

I claim:

1. An ice scraper of a type used to scrape ice from vehicle windows comprising:
   (a) a housing;
   (b) a handle attached to said housing;
   (c) a scraper element having a beveled ice scraping edge on one side thereof and a substantially identical ice scraping edge on the other side thereof;
   (d) scraper element receiving and holding means disposed in said housing for receiving and frictionally holding said scraper element firmly attached to said handle, said scraper receiving and holding means comprising means for forming an opening in said housing of substantially the same shape and size as said one side and said other side of said scraper element whereby said one side of said scraper element will be frictionally press fit into said opening; and
   (e) access means for providing access to the other side of said scraper element when said other side is disposed in said scraper element receiving and holding means whereby when said one side of said scraper element becomes dull, said scraper element can be pried out of said scraper element receiving and holding means through said access means and said one side of said scraper element can then be forced into said scraper element receiving and holding means for allowing the other side of said scraper element to be used as an ice scraping edge after said one edge has become too dull to be useful as an ice scraping edge.

2. An ice scraper as defined in claim 1 wherein said access means comprises three openings in said housing adjacent to and leading to the beveled surface of said other surface whereby a prying tool can be used to pry on the center and each end of the beveled edge of said other side of the scraper element.

3. An ice scraper as defined in claim 2 wherein said three openings are cylindrical in shape over most of their length.

* * * * *